(12) United States Patent
Ryu

(10) Patent No.: US 7,787,902 B2
(45) Date of Patent: Aug. 31, 2010

(54) MOBILE COMMUNICATION TERMINAL HAVING ROLL-KEY AND METHOD OF PROCESSING INPUT SIGNAL USING THE SAME

(75) Inventor: Ho Sung Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 662 days.

(21) Appl. No.: 11/683,267

(22) Filed: Mar. 7, 2007

(65) Prior Publication Data

US 2008/0125196 A1 May 29, 2008

(30) Foreign Application Priority Data

Nov. 28, 2006 (KR) ................ 10-2006-0118205

(51) Int. Cl.
*H04M 1/00* (2006.01)
(52) U.S. Cl. ............... 455/550.1; 455/566; 455/575.3; 455/575.4; 379/433.01; 379/433.06
(58) Field of Classification Search ... 455/575.3–575.4, 455/566, 550.1; 379/428.01, 433.04, 433.06, 379/433.12, 433.01; 345/156–172
See application file for complete search history.

(56) References Cited

U.S. PATENT DOCUMENTS

| | | | | |
|---|---|---|---|---|
| 5,436,954 A | * | 7/1995 | Nishiyama et al. | ........... 455/566 |
| 6,332,024 B1 | * | 12/2001 | Inoue et al. | ............ 379/433.06 |
| 6,813,509 B2 | * | 11/2004 | Aquilar et al. | ........... 455/550.1 |
| 6,965,782 B1 | * | 11/2005 | Nuovo et al. | ............. 455/550.1 |
| 7,502,636 B2 | * | 3/2009 | Sakuta et al. | ............ 455/575.1 |
| 7,539,524 B2 | * | 5/2009 | Chen | ....................... 455/575.1 |
| 2003/0017858 A1 | * | 1/2003 | Kraft et al. | .................. 455/566 |
| 2003/0095086 A1 | * | 5/2003 | Neuhaeusler et al. | ......... 345/82 |
| 2004/0170270 A1 | * | 9/2004 | Takashima et al. | .......... 379/363 |
| 2004/0253931 A1 | * | 12/2004 | Bonnelykke et al. | ....... 455/90.3 |
| 2005/0181842 A1 | * | 8/2005 | Yang | ....................... 455/575.1 |
| 2008/0125182 A1 | * | 5/2008 | Park et al. | ................... 455/566 |
| 2008/0242381 A1 | * | 10/2008 | Hyun et al. | .............. 455/575.4 |

* cited by examiner

*Primary Examiner*—Kamran Afshar
*Assistant Examiner*—Babar Sarwar
(74) *Attorney, Agent, or Firm*—Lee, Hong, Degerman, Kang & Waimey

(57) ABSTRACT

A mobile communication terminal having a roll-key and method of processing an input signal using the same are disclosed, by which a hot-key function can be performed using a rotational input device in a standby screen mode. The present invention includes a roll-key outputting a signal according to a rotational action of a roller projected from a prescribed portion of a front side of the terminal in part, a control unit outputting a control signal to execute a hot-key operation corresponding to a recognized action of the roll-key, and a display unit outputting an image to implement a corresponding operation according to a signal provided by the control unit.

16 Claims, 5 Drawing Sheets

MOBILE COMMUNICATION TERMINAL HAVING ROLL-KEY AND METHOD OF PROCESSING INPUT SIGNAL USING THE SAME

This application claims the benefit of the Korean Patent Application No. 10-2006-0118205, filed on Nov. 28, 2006, which is hereby incorporated by reference as if fully set forth herein.

BACKGROUND OF THE INVENTION

1. Field of the Invention

The present invention relates to a mobile communication terminal, and more particularly, to a mobile communication terminal having a roll-key and method of processing an input signal using the same. Although the present invention is suitable for a wide scope of applications, it is particularly suitable for providing the roll-key to a prescribed portion of a front side of the mobile communication terminal.

2. Discussion of the Related Art

Generally, in case that there are too many items are displayed via a display device of a terminal, a navigation key or a side key provided to one side to be used in adjusting a volume is used to move a cursor upward or downward. So, if the number of the items is too great, it is very inconvenient for a user is to press the side button several times.

In order to solve the inconvenient problem, a mobile communication terminal, which is provided with a roll-key facilitating a cursor to move using a roller rotating and moving upward and downward and a signal according to a rotation of the roller has been proposed.

However, methods of utilizing the mobile communication terminal provided with the roll-key in various ways have not been sufficiently provided yet.

SUMMARY OF THE INVENTION

Accordingly, the present invention is directed to a mobile communication terminal having a roll-key and method of processing an input signal using the same that substantially obviate one or more problems due to limitations and disadvantages of the related art.

An object of the present invention is to provide a mobile communication terminal, which is capable of performing a hot-key function using a rotational input device in a standby screen mode.

Another object of the present invention is to provide a mobile communication terminal having a roll-key and method of processing an input signal using the same, by which a roll-key is touched to implement a corresponding function in pushing upward a slide of a slide phone.

Another object of the present invention is to provide a mobile communication terminal having a roll-key and method of processing an input signal using the same, by which user's convenience is enhanced in a manner of displaying an arrangement configuration of the roll-key on a standby screen.

A further object of the present invention is to provide a mobile communication terminal having a roll-key and method of processing an input signal using the same, by which a problem taking place in opening or closing a slide phone provided with the roll-key.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

First of all, the present invention is characterized in that a mobile communication terminal displays an image that queries a function entering confirmation on a standby screen by moving a roll-key regardless of a user's intention before an assigned motion is implemented.

Secondly, a mobile communication terminal according to the present invention is characterized in recognizing a rotational direction of a roll-key provided to a prescribed portion of the terminal and implementing an operation of switching to a mode for an implementation of an operation corresponding to the recognized rotational direction.

Thirdly, a mobile communication terminal according to the present invention is characterized in preventing a corresponding function from being implemented by touching a roll-key in moving upward a slide of a slide phone.

To achieve these objects and other advantages and in accordance with the purpose of the invention, as embodied and broadly described herein, a mobile communication terminal according to the present invention includes a roll-key outputting a signal according to a rotational action of a roller projected from a prescribed portion of a front side of the terminal in part, a control unit outputting a control signal to execute a hot-key operation corresponding to a recognized action of the roll-key, and a display unit outputting an image to implement a corresponding operation according to a signal provided by the control unit.

Preferably, the mobile communication terminal further includes a pair of pushbuttons provided next to both sides of the roller to output input signals according to push actions, respectively.

Preferably, the display unit displays an arrangement configuration image of a hot-key corresponding to an input via the roll-key on a front display window.

Preferably, the display unit displays an image of the roll-key on a front display window.

Preferably, the mobile communication terminal is a folder type terminal.

Preferably, the mobile communication terminal is a slide type terminal having a display window provided to an upper body.

More preferably, in having the upper body slide to be opened in a hold mode to cut off an input of the roll-key, a signal inputted via the roll-key is ignored for a prescribed time.

More preferably, in having the upper body slide to be closed, the image displayed via the display unit is removed and it is then switched to a hold mode to cut off the input of the roll-key.

More preferably, the image of the roll-key is displayed on a position corresponding to a rotational direction of the roll-key. In this case, a previous state is recovered if the roll-key is rotated in a reverse direction while the image corresponding to the action of the roll-key is displayed on the front display window.

Preferably, a hot-key function for a wireless service operation implementation of a mobile communication service provider is assigned to at least one of upper and lower rotations of the roll-key.

In another aspect of the present invention, a method of processing an input signal in a mobile communication terminal having a roll-key includes the steps of receiving a signal inputted via the roll-key in a call standby mode and performing a hot-key operation corresponding to a signal provided by the roll-key.

Preferably, the method further includes the step of displaying an image to confirm a function execution according to an input via the roll-key.

Preferably, in case of a slide phone having a roll-key function, in pushing to open a slide while a roll-key hold mode is released, an input signal via the roll-key is ignored for a prescribed time.

In another aspect of the present invention, a method of processing an input signal in a mobile communication terminal having a roll-key, in which the terminal receives a signal according to a rotational action of the roll-key provided to a prescribed portion of the terminal, includes the steps of recognizing a rotational direction of the roll-key and switching to a mode for an implementation of an operation corresponding to the recognized rotational direction of the roll-key.

Preferably, if rotational input signals from a same rotational direction are consecutively received for a reference time, corresponding received signals are received by being restricted to a prescribed count.

More preferably, if the rotational direction of the roll-key provided to a slide type terminal matches an opening direction of the terminal, the rotational input signal received within a prescribed time is ignored.

Preferably, the method further includes the step of outputting a guide image for a key input in detecting the rotation.

Preferably, the method further includes the step of checking a presence or non-presence of an entry to a mode corresponding to the rotational direction of the roll-key.

Preferably, the method further includes the step of releasing the entered mode in case of an action of the roll-key in a direction reverse to the rotational direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
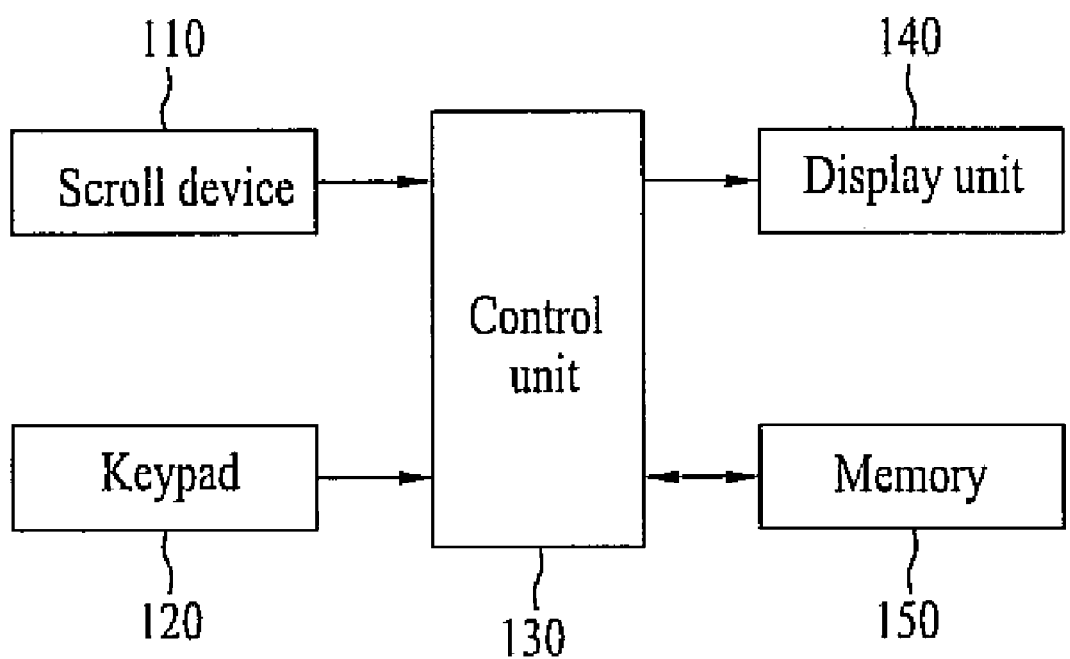
FIG. 1 is a schematic block diagram of a mobile communication terminal according to the present invention.

FIG. 1 is a schematic block diagram of a mobile communication terminal according to the present invention.

Referring to FIG. 1, a mobile communication terminal according to the present invention includes a roll-key 110 outputting a signal according to an upper or lower rotational action of a roller projected from a prescribed portion of a front side of the terminal, a keypad 120 provided with a plurality of numeral keys and a plurality of functions keys, a control unit 130 outputting a control signal to perform an abbreviated function (hot-key) operation corresponding to a recognition of a rotational motion of the roll-key 110 in a call standby mode, a display unit 140 outputting an image to implement an operation corresponding to a signal provided by the control unit 130, and a memory 150 storing a program necessary for an operation of the control unit 130.

Figure 2:
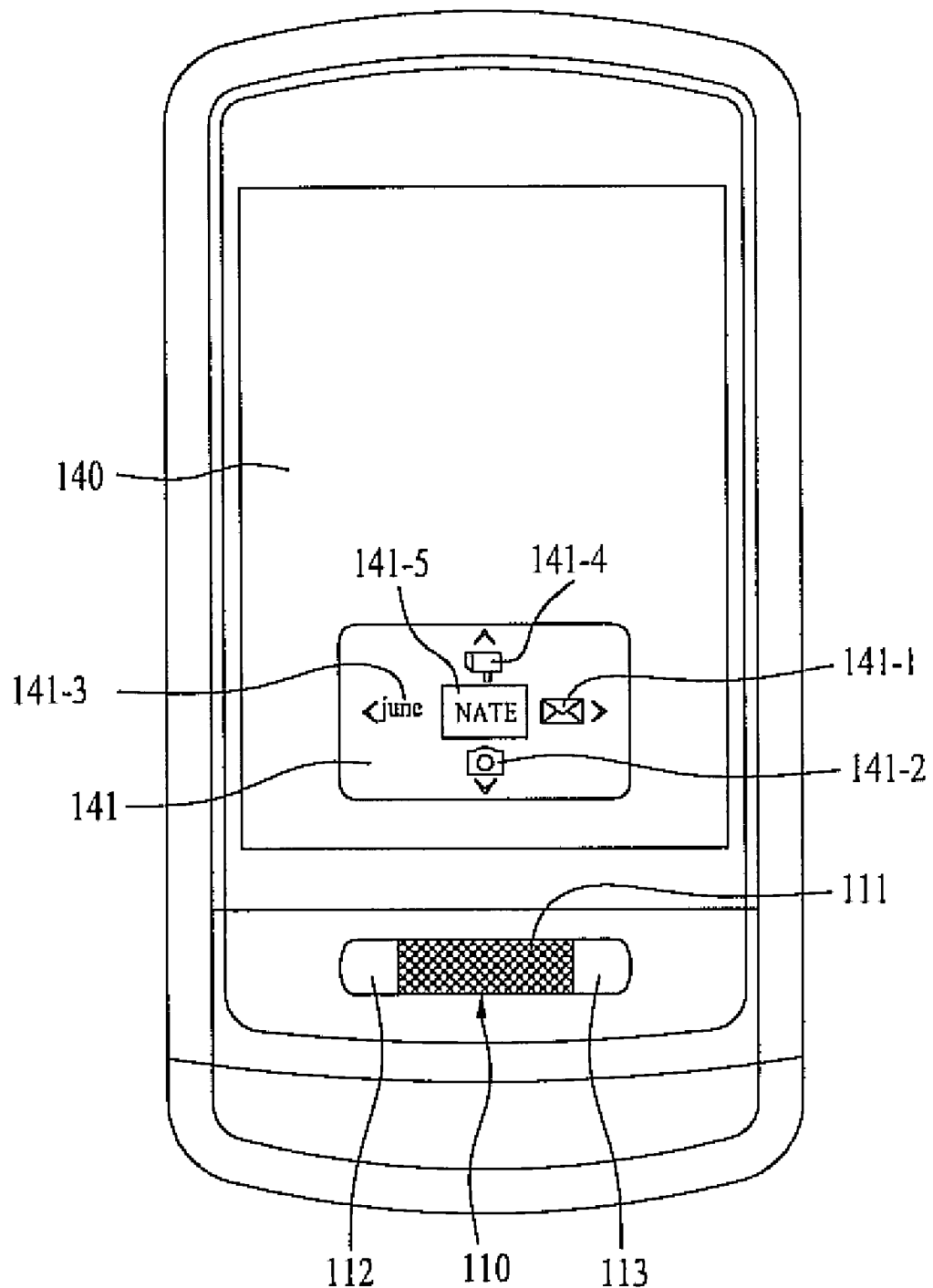
FIG. 2 is an exemplary layout of an exterior of a terminal according to one embodiment of the present invention.

FIG. 2 is an exemplary layout of an exterior of a terminal according to one embodiment of the present invention. On the following description, a slide phone, of which upper body including a front display window slides upward and downward, is taken as an example. Yet, since concepts of the present invention are also applicable to a folder type terminal in part, the present invention is not limited to the slide phone.

Referring to FIG. 2, a roll-key 110 is provided to one side of a front side of a terminal. The roll-key 110 includes a roller 111 rotating and moving upward and downward and a pair of pushbuttons 112 and 113 provided to left and right sides of the roller 111.

A guide image 141, which displays a function implemented by an action of the roll-key 110 on a prescribed portion of the display unit 140, is displayed for example. And, the guide image 141 represents a message associated function 141-1, a camera function 141-2, a multimedia wireless service 141-3 provided by a wireless service provider, a mailbox function 141-4, and a radio service function 141-5 to perform a content service different from the multimedia radio service.

Wireless services by a wireless service provider include 'nate' and 'june' by SK Telecom (SKT) for example. And, the differences between then lie in the provided contents and services. The 'nate' enables bell sound/picture friend/color ring/live bell and the like to be downloaded and provides such a service as 'finding friends', 'weather forecasting', 'stock market' and the like. On the other hand, the 'june' service is a multimedia service that enables music video/VOD (video on demand)/MOD (music on demand) to be downloaded and enables such a service as a real-time TV and the like to be serviced. A wireless internet charge corresponds to a packet billing system that charges a money according to a packet volume. Contents provided by the 'nate' are small in volume, whereas contents provided by the 'june' are large in volume.

Preferably, one wireless service is assigned to at least one of upper and lower directions of the roll-key. Optionally, another wireless service can be assigned to the left or right pushbutton.

Besides, the diagram in the drawing just follows the embodiment of the present invention and can be modified in function assignment and function key setups.

Figure 3:
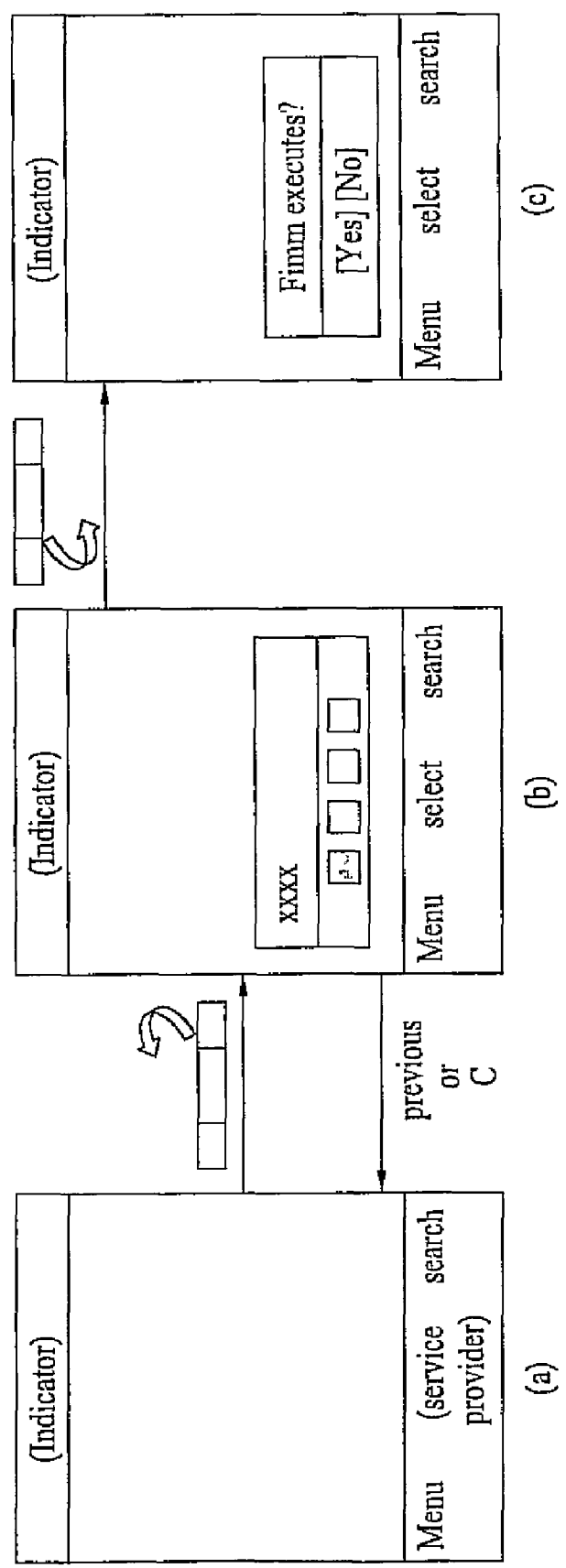
FIG. 3 is an exemplary diagram of a screen display state according to another embodiment of the present invention.

FIG. 3 is an exemplary diagram of a screen display state according to another embodiment of the present invention, which shows that a standby image includes a theme and items except a button display.

Referring to FIG. 3, if the roller 11 is rotated upward on a standby image (a), a mailbox function, as shown in (b) of FIG. 3, is implemented to display a mailbox indication on a display window. If the roller 111 is rotated in a reverse direction or a previous button is pressed, an original state is recovered.

If the roller 111 is rotated downward on a standby image (a), an image to perform a wireless internet service provided by a wireless service provider is displayed. In this case, in order to prevent a function implementation due to a manipulation error of the roll-key, an image to confirm a function entry is displayed. Of course, since the wireless service is separately charged, an image querying a password can be further displayed according to a presence or non-presence of user's setup.

In case that rotational input signals are consecutively received in one rotational direction for a reference time, the corresponding received signals are received by being restricted to a prescribed count. And, if an open direction of the terminal matches a rotational direction of the roll-key, a rotational input signal received within the reference time is ignored.

Figure 4:
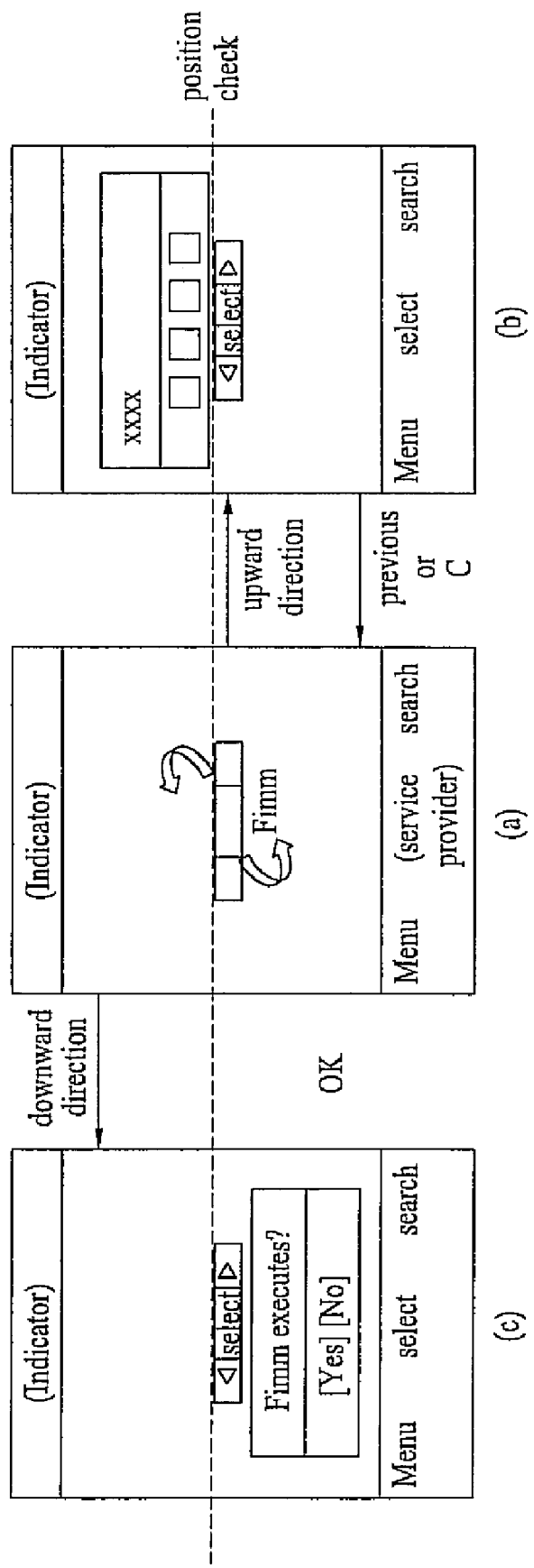
FIG. 4 is an exemplary diagram of a screen display state according to a further embodiment of the present invention.

FIG. 4 is an exemplary diagram of a screen display state according to a further embodiment of the present invention.

Referring to FIG. 4, unlike the case shown in FIG. 3, in case that a standby image is set to a theme and a button display or a watch and a button display, an image, as shown in (a) of FIG. 4, is displayed on a display window. If the roller 111 is rotated upward in this state, a mailbox function, as shown in (b) of FIG. 4, is implemented to display a mailbox display on the display window. In this case, unlike FIG. 3, it can be observed that an image by the mailbox function implementation is displayed on an upper part centering on a display position of the roll-key image. In this case, if the roll-key is rotated in a reverse direction or if a previous button is pressed, an original state is recovered.

Besides, if the roller 111 is rotated downward in the standby mage (a), an image to perform a wireless internet service provided by a wireless service provider is displayed. In this case, unlike FIG. 3, it can be observed that a confirmation window for a wireless service function implementation is displayed on a lower part centering on the display position of the roll-key image. Of course, if the roller is rotated upward or if the previous key is pressed, the original state is recovered.

Figure 5:
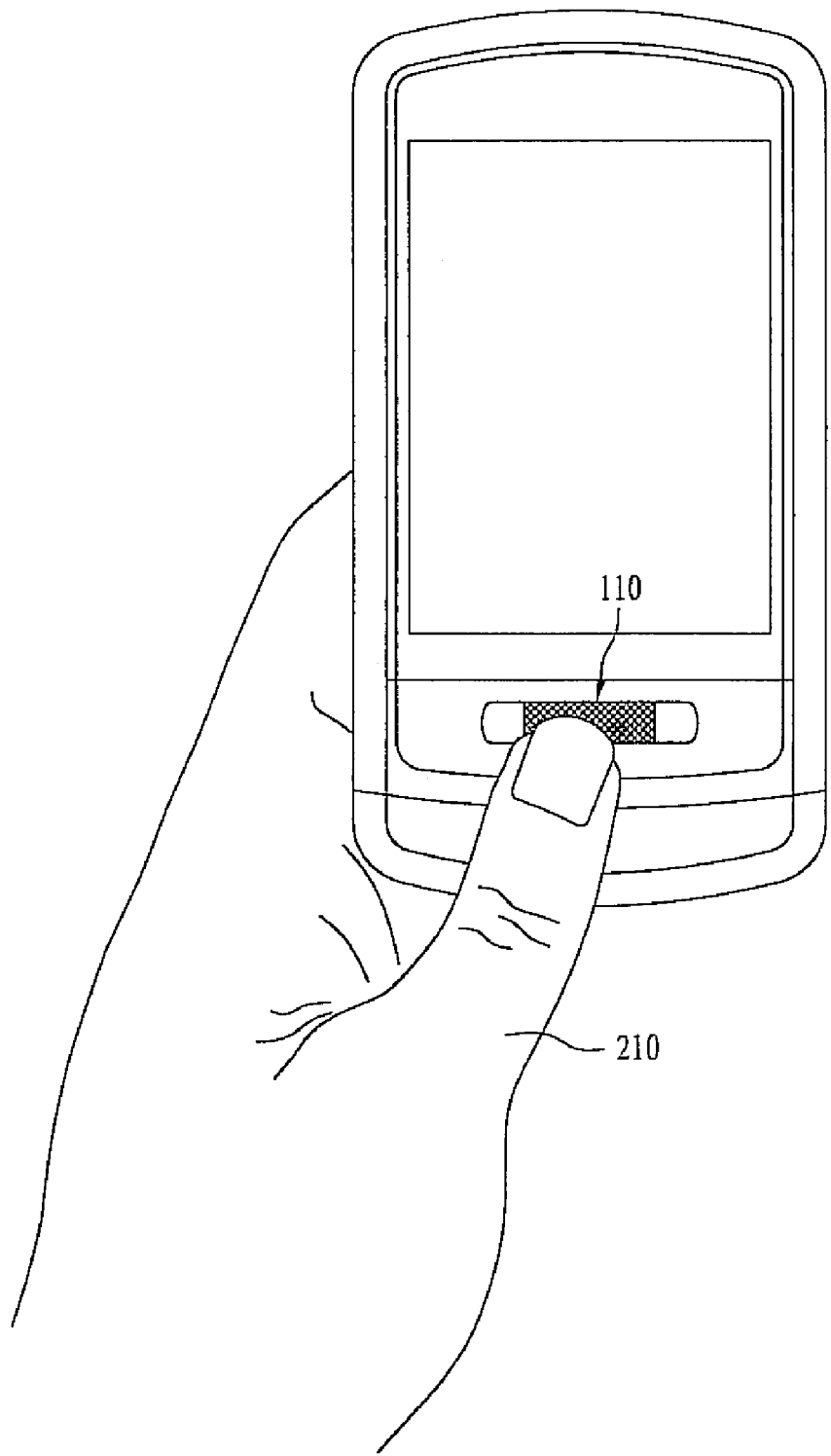
FIG. 5 is an exemplary diagram to explain a state that an upper body slides to be opened.

FIG. 5 is an exemplary diagram to explain a state that an upper body slides to be opened.

Referring to FIG. 5, in most cases, a user presses an upper body or a lower end of the body with his thumb to move upward a slide. Thus, the roll-key may be touched by a finger in the process of pushing up the slide phone. When the upper body slides to be open in an input restricted mode (hold mode) to cut off an input of the roll-key, a signal inputted via the roll-key is ignored for a prescribed time. A user is able to set up a validity of an input of a signal according to a rotation of the roll-key. In particular, in case of the hold mode, a signal is processed as an input signal even if the roll-key is rotated. So, it is able to solve the problem or inconvenience caused by an upward rotation of the roller regardless of a user's intention.

In closing the terminal by having the upper body slide down while a prescribed image is displayed on the screen, the image displayed via the display unit is removed and it is immediately switched to the hold mode to cut off an input of the roll-key. This is to prevent an erroneous operation from taking place in putting the terminal in a pocket or handbag.

Accordingly, the present invention provides the following effects or advantages.

First of all, the present invention is able to prevent a user's unintentional implementation of a function due to a roll-key operation on a standby image.

Secondly, the present invention is able to prevent an implementation of an unintentional operation in case of pushing up a slide phone.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A slide-type mobile communication terminal comprising:
    an upper body;
    a roll-key for outputting a signal according to a rotational action of a roller projected from a prescribed portion of a front side of the terminal;
    a control unit for outputting a control signal to execute a hot-key operation corresponding to a recognized action of the roll-key; and
    a display unit for outputting an image to implement a corresponding operation according to a signal provided by the control unit,
    wherein if rotational action from a same rotational direction is consecutively received for a reference time, corresponding received rotational output signals are restricted to a prescribed count, and
    wherein a signal input via the roll-key is ignored for a prescribed time when the upper body is slid to open the mobile communication terminal in a hold mode to cut off an input of the roll-key.

2. The mobile communication terminal of claim 1, further comprising a pair of pushbuttons provided next to both sides of the roller for outputting signals according to push actions, respectively.

3. The mobile communication terminal of claim 1, wherein the display unit displays an arrangement configuration image of a hot-key corresponding to an input via the roll-key on a front display window.

4. The mobile communication terminal of claim 1, wherein the display unit displays an image of the roll-key on a front display window.

5. The mobile communication terminal of claim 4, wherein the image of the roll-key is displayed on a position corresponding to a rotational direction of the roll-key.

6. The mobile communication terminal of claim 5, wherein a previous state is recovered if the roll-key is rotated in a reverse direction while the image to implement the corresponding operation is displayed on the front display window.

7. The mobile communication terminal of claim 5, wherein:
    a function-related image is displayed on an upper part or lower part of the display centering on the display position of the image of the roll-key according to a rotational direction of the roll-key.

8. The mobile communication terminal of claim 7, wherein the function-related image is an image for a mailbox or an image for a wireless Internet service.

9. The mobile communication terminal of claim 1, wherein the upper body includes a display window.

10. The mobile communication terminal of claim 9, wherein when the upper body is slid to close the mobile communication terminal, the image output by the display unit is removed and the mobile communication terminal is then switched to a hold mode to cut off the input of the roll-key.

11. The mobile communication terminal of claim 1, wherein a hot-key function for a wireless service operation implementation of a mobile communication service provider is assigned to at least one of upper and lower rotations of the roll-key.

12. A method of processing an input signal in a slide-type mobile communication terminal having a roll-key, in which the terminal receives rotational input signals according to a rotational action of the roll-key provided on a prescribed portion of the terminal, the method comprising:
- recognizing a rotational direction of the roll-key; and
- switching to a mode for an implementation of an operation corresponding to the recognized rotational direction of the roll-key,
- wherein if rotational input signals from a same rotational direction are consecutively received for a reference time, corresponding received rotational input signals are restricted to a prescribed count, and
- wherein if the recognized rotational direction of the roll-key matches an opening direction of the terminal, the rotational input signals received within the reference time are ignored.

13. The method of claim 12, further comprising the step of outputting a guide image for a key input in recognizing the rotational direction.

14. The method of claim 12, further comprising the step of checking a presence or non-presence of an entry to a mode corresponding to the rotational direction of the roll-key.

15. The method of claim 12, further comprising the step of switching out of the mode in case of an action of the roll-key in a direction reverse to the rotational direction.

16. The mobile communication terminal of claim 12, wherein a rotational input signal received via the roll-key is ignored for the reference time when pushing to open the terminal while a roll-key hold mode is released.

* * * * *